A. T. DUNBAR.
Horse Hay-Rake.
No. 84,999. Patented Dec. 15, 1868.
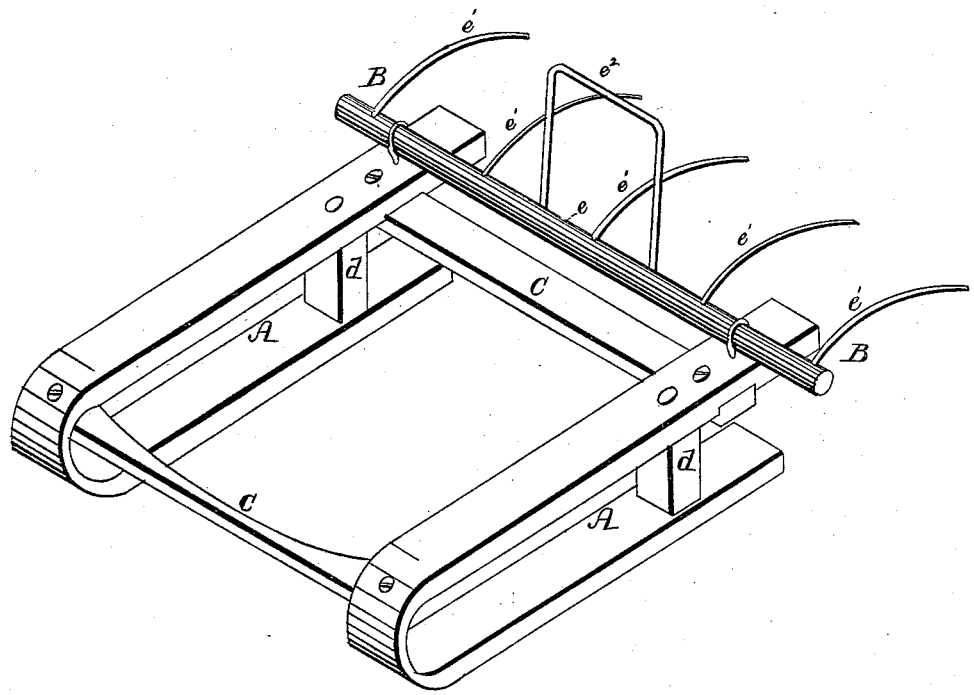

A. T. DUNBAR, OF ALBA, PENNSYLVANIA.

Letters Patent No. 84,999, dated December 15, 1868.

IMPROVEMENT IN HORSE HAY-RAKES.

The Schedule referred to in these Letters Patent and making part of the same.

*To all whom it may concern:*

Be it known that I, A. T. DUNBAR, of Alba, in the county of Bradford, and State of Pennsylvania, have invented certain new and useful Improvements in Horse Hay-Rake and Gleaner; and I do hereby declare that the following is a full, clear, and exact description thereof, reference being had to the accompanying drawings, and to the letters of reference marked thereon, which form a part of this specification, and in which is represented a perspective view of my horse hay-rake.

The nature of my invention consists in the employment of runners, formed by bending the front end of a bar or ordinary runner upwards, and extending it back parallel with the lower bar or runner, so that its end will project out a short distance beyond the rear end of the lower bar, and connecting them together, substantially as will be hereinafter described.

To enable others skilled in the art to which my invention appertains, I will now describe the construction and operation of the same.

In the accompanying drawing—

A A represent the runners of the machine, which are constructed as above set forth, or as shown in the annexed drawing.

These runners are connected together, at front and rear, by means of a lateral bar, c, as shown, and the two parts of each runner are held together, at its rear or open end, by a vertical brace or standard, $d\ d$.

B designates the rake, consisting of the rod or bar $e$, which is provided with the teeth $e^1\ e^1$, and handle $e^2$, for operating the rake, the said rod being hinged or pivoted to the projecting ends of the upper bars of the runners by means of metal loops.

To operate my rake, the machine will be put in motion, and the rake B pressed down into the hay by means of its handle or lever, and thus gather the hay, which, when full, will be raised up, depositing the hay in a pile, and the same operation being repeated until the work is accomplished.

What I claim, and desire to secure by Letters Patent, is—

The runners A A, so constructed as to form raves, the ends of the raves extending beyond the ends of the runners, arranged in combination with the rake B, operating substantially as and for the purpose set forth.

In testimony that I claim the foregoing as my own, I affix my signature, in the presence of two witnesses.

A. T. DUNBAR.

Witnesses:
 DAVID PALMER,
 CARLTON C. HOOKER.